United States Patent
Ye et al.

(10) Patent No.: US 9,864,465 B2
(45) Date of Patent: Jan. 9, 2018

(54) NOISE SUPPRESSION METHOD AND SYSTEM FOR TOUCH DETECTION AND TOUCH TERMINAL

(71) Applicant: SHENZHEN GOODIX TECHNOLOGY CO., LTD., Guangdong (CN)

(72) Inventors: Jinchun Ye, Guangdong (CN); Haolei Wang, Guangdong (CN); Bin Ruan, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 127 days.

(21) Appl. No.: 14/548,954

(22) Filed: Nov. 20, 2014

(65) Prior Publication Data

US 2015/0077402 A1    Mar. 19, 2015

Related U.S. Application Data

(63) Continuation of application No. PCT/CN2013/078662, filed on Jul. 2, 2013.

(30) Foreign Application Priority Data

Jul. 19, 2012  (CN) .......................... 2012 1 0266422

(51) Int. Cl.
    *G06F 3/041*       (2006.01)
(52) U.S. Cl.
    CPC .................. *G06F 3/0418* (2013.01)
(58) Field of Classification Search
    None
    See application file for complete search history.

(56) References Cited

U.S. PATENT DOCUMENTS

| | | | |
|---|---|---|---|
| 7,031,886 B1* | 4/2006 | Hargreaves | G06F 3/044 375/350 |
| 2008/0157882 A1* | 7/2008 | Krah | G06F 3/0416 331/18 |

(Continued)

FOREIGN PATENT DOCUMENTS

| | | |
|---|---|---|
| CN | 1197555 | 10/1998 |
| CN | 101324822 | 12/2008 |

(Continued)

OTHER PUBLICATIONS

International Search Report filed in PCT/CN2013/078662 dated Oct. 17, 2013.

*Primary Examiner* — Christopher Kohlman

(57) ABSTRACT

The present invention is applicable to the technical field of touch control. Provided are a touch detection system and a noise suppression method therefor. The method includes the steps of: sequentially driving a touch detection system with all driving frequencies that the touch detection system supports, and detecting a currently existing interference strength value when driving with each driving frequency; and frequency-hopping to the driving frequency corresponding to the minimum interference strength value, and driving the touch detection system with the driving frequency corresponding to the minimum interference strength value to perform a normal operation. By detecting an interference strength value at each driving frequency and then using the driving frequency corresponding to the minimum interference strength value as an operating frequency of a touch terminal, the present invention minimizes the signal interference of a touch detection system.

15 Claims, 9 Drawing Sheets

(56) References Cited

U.S. PATENT DOCUMENTS

| | | | | |
|---|---|---|---|---|
| 2008/0157893 A1* | 7/2008 | Krah | ................. | G06F 3/0418 |
| | | | | 331/177 R |
| 2008/0309628 A1 | 12/2008 | Krah et al. | | |
| 2013/0257765 A1* | 10/2013 | Lee | ................. | G06F 3/0418 |
| | | | | 345/173 |
| 2013/0293511 A1* | 11/2013 | Nam | ................. | G06F 3/0418 |
| | | | | 345/174 |

FOREIGN PATENT DOCUMENTS

| | | |
|---|---|---|
| CN | 201315054 | 9/2009 |
| CN | 101958090 | 1/2011 |
| CN | 102138121 | 7/2011 |
| CN | 102830837 | 12/2012 |

\* cited by examiner

NOISE SUPPRESSION METHOD AND SYSTEM FOR TOUCH DETECTION AND TOUCH TERMINAL

FIELD OF THE INVENTION

The present invention relates to the technical field of touch control, and more particularly to a touch detection system and a noise suppression method.

BACKGROUND OF THE INVENTION

Signal interferences of touch control terminals include liquid crystal display module (LCD module, LCM) interferences and common mode interferences. How to effectively overcome LCM interferences and common mode interferences is always a focus problem concerned by the industry.

At present, a usual method for avoiding LCM interferences in the industry is to add a shielding layer on a module. In the Chinese utility model patent application that has the application number of 201120048977.2 and is entitled as "Anti-interference LCM display structure", by adding an anti-interference shielding layer, the anti-interference performance of the product is improved, and the service life of the product is further improved. However, the method of adding the shielding layer challenges the structure of the product, and is inconvenient for the product to develop towards the direction of miniaturization and thinness.

Furthermore, for avoiding common mode interferences, the main method of the current industry is to improve the circuit structure. In the Chinese invention patent application that has the application number of 201010146215.6 and is entitled as "Touch detection method and detection circuit for capacitive touch screen", by improving the circuit structure, the anti-interference capability of a capacitive touch screen is improved. In this application, the rows of the touch screen capacitance matrix require being scanned; two rows or two columns can be scanned every time to obtain the capacitance difference value between the two rows or the two columns, or one row or one column can be scanned every time to obtain the capacitance difference value between the row or the column and a benchmark capacitance, and the obtained capacitance difference value data is processed. This processing method is complicated and has a large amount of computation.

Each of the above-mentioned methods discloses methods for overcoming LCM interferences and common mode interferences individually; however, there is no method capable of overcoming both LCM interferences and common mode interferences at present.

SUMMARY OF THE INVENTION

The technical problem to be solved by the present invention is to provide a noise suppression method, system and a touch terminal with high versatility, and thereby minimize the signal interferences of the touch terminal.

The present invention is realized by the following technical solution: a noise suppression method for touch detection, comprising the following steps:

sequentially driving a touch detection system with all driving frequencies supported by the touch detection system, and detecting an interference strength value of the touch detection system when driving with each driving frequency; and frequency-hopping to a driving frequency corresponding to the minimum interference strength value, and driving the touch detection system to perform a normal operation with the driving frequency corresponding to the minimum interference strength value.

Furthermore, the step of sequentially driving a touch detection system with all driving frequencies supported by the touch detection system, and detecting an interference strength value of the touch detection system when driving with each driving frequency includes the following steps:

driving the touch detection system with one driving frequency supported by the touch detection system, and obtaining an interference strength value at the current driving frequency;

judging whether the obtained interference strength value at the current driving frequency is greater than a predetermined first threshold value;

if yes, further switching to another driving frequency supported by the touch detection system to drive the touch detection system, detecting and judging whether the current interference strength value is greater than the predetermined first threshold value, until interference strength values at all supported driving frequencies are obtained; if consecutively detecting that interference strength values at a plurality of frequencies are all less than a predetermined second threshold value, quitting the current noise detection, and backing the detected frequency point.

Furthermore, the step of driving the touch detection system with one driving frequency supported by the touch detection system, and obtaining an interference strength value at the current driving frequency includes the following steps:

at the current driving frequency, consecutively scanning the same driving electrode twice to obtain two groups of sampling data, calculating the difference value between the two groups of sampling data, and using the obtained difference value as an interference component of the current driving electrode; obtaining interference components of a plurality of driving electrodes at the current driving frequency according to this method, calculating a sum of absolute values of the interference components, and using the sum as the interference strength value of the touch detection system at the current driving frequency.

Furthermore, the step of driving the touch detection system with one driving frequency supported by the touch detection system, and obtaining an interference strength value at the current driving frequency further includes the following steps:

calculating a plurality of interference strength values at the current driving frequency; and selecting the greatest value from the plurality of obtained interference strength values and using the greatest value as the interference strength value at the current driving frequency.

Furthermore, between the step of calculating a plurality of interference strength values at the current driving frequency and the step of selecting the greatest value from the plurality of obtained interference strength values and using the greatest value as the interference strength value at the current driving frequency, the method further includes the following step:

judging whether the plurality of obtained interference strength values are all less than a predetermined third threshold value; if yes, calculating the plurality of interference strength values at the current driving frequency again; if no, selecting the greatest value from the plurality of obtained interference strength values and using the greatest value as the interference strength value at the current driving frequency.

Furthermore, after the step of frequency-hopping to a driving frequency corresponding to the minimum interference strength value, and driving the touch detection system to perform a normal operation with the driving frequency corresponding to the minimum interference strength value, the method further includes the following step:

judging whether the minimum interference strength value is greater than a predetermined fourth threshold value; if yes, using the minimum interference strength value as the predetermined first threshold value; if no, using a sum of the minimum interference strength value and a predetermined interference constant value as the predetermined first threshold value.

Furthermore, the step of if yes, further switching to another driving frequency supported by the touch detection system to drive the touch detection system, detecting and judging whether the current interference strength value is greater than the predetermined first threshold value, until interference strength values at all supported driving frequencies are obtained; if consecutively detecting that interference strength values at a plurality of frequencies are all less than a predetermined second threshold value, quitting the current noise detection, and backing the detected frequency point includes the following steps:

if interference strength values corresponding to a group of consecutively switched driving frequencies are all less than the predetermined second threshold value, and this group of driving frequencies is the first scanned group, or the interference strength values corresponding to the group of consecutively switched driving frequencies are all not less than the predetermined second threshold value, but all frequencies have been switched, selecting a driving frequency corresponding to the minimum interference strength value from the switched driving frequencies, using the selected driving frequency as a target frequency of frequency-hopping, and using the minimum interference strength value as the predetermined first threshold value.

Furthermore, the method further includes the following steps:

if the interference strength values corresponding to the group of consecutively switched driving frequencies are all less than the predetermined second threshold value, and this group of driving frequencies is not the first scanned group, further judging whether the latest two groups of scanned frequencies are the first two groups of scanned frequencies;

if the judging result is yes, abandoning the interference strength values corresponding to this group of frequencies; and if the result is no, abandoning the interference strength values corresponding to the latest two groups of scanned frequencies.

The present invention further provides a noise suppression system for touch detection, which comprises:

a driving unit configured to drive a touch detection system with a certain frequency;

a drive control unit configured to control the driving unit to sequentially drive the touch detection system with all driving frequencies supported by the touch detection system;

an interference detecting unit configured to detect an interference strength value of the touch detection system when the driving unit drives with each driving frequency; and a frequency-hopping unit configured to frequency-hops to a driving frequency corresponding to the minimum interference strength value according to the detection result of the interference detecting unit, and thereby make the driving unit drive the touch detection system to perform a normal operation with the driving frequency corresponding to the minimum interference strength value.

Furthermore, the interference detecting unit includes:

an interference strength detecting module configure to: when the driving unit drives the touch detection system with a driving frequency supported by the touch detection system, obtain an interference strength value at the current driving frequency;

a first judging module configured to determine the interference strength value obtained by the interference strength detecting module and judge whether it is greater than a predetermined first threshold value; and a driving frequency switching module configured to: when the judging result of the first judging module is greater, further switch to another driving frequency supported by the touch detection system to drive the touch detection system, and trigger the drive control unit to control the driving unit to drive the touch detection system with the switched driving frequency;

wherein, the first judging module and the driving frequency switching module repeat the judging and switching processes many times until interference strength values at all supported frequencies are obtained; during this process, if the first judging module consecutively detects that interference strength values at a plurality of frequencies are all less than a predetermined second threshold value, the current noise detection is quitted, and the detected frequency point is backed.

Furthermore, the interference strength detecting module further includes:

an interference component calculating sub-module configured to: at the current driving frequency, consecutively scan each driving electrode twice to obtain two groups of sampling data, calculate the difference value between the two groups of sampling data, and use the obtained difference value as an interference component of the corresponding driving electrode; and a first interference strength calculating sub-module configured to: calculate a sum of absolute values of the interference components obtained by the interference component calculating sub-module, and use the sum as the interference strength value of the touch detection system at the current driving frequency.

Furthermore, the interference strength detecting module further includes:

a cycle control sub-module configured to control the interference component calculating sub-module and the first interference strength calculating sub-module to operate repeatedly and obtain a plurality of interference strength values at the current driving frequency; and a second interference strength calculating sub-module configured to select the greatest value from the plurality of interference strength values obtained by the cycle control sub-module and use the greatest value as the interference strength value at the current driving frequency Furthermore, the interference strength detecting module further includes:

a second judging sub-module configured to: judge whether the plurality of interference strength values obtained by the cycle control sub-module are all less than a predetermined third threshold value; if yes, control the cycle control sub-module to perform a cycle control again; and if no, control the second interference strength calculating sub-module to select the greatest value from the plurality of interference strength values and use the greatest value as the interference strength value at the current driving frequency.

Furthermore, the noise suppression system for touch detection further includes:

a third judging module configured to: judge whether the minimum interference strength value is greater than a predetermined fourth threshold value; if yes, use the minimum interference strength value as the predetermined first threshold value; and if no, use a sum of the minimum interference strength value and a predetermined interference constant value as the predetermined first threshold value.

Furthermore, the interference detecting unit further includes:

a fourth judging module configured to judge whether interference strength values corresponding to a group of driving frequencies consecutively switched by the driving frequency switching module are all less than the predetermined second threshold value, and this group of driving frequencies is the first scanned group, or whether the interference strength values corresponding to the group of consecutively switched driving frequencies are all not less than the predetermined second threshold value, but all frequencies have been switched;

wherein, when the judging result of the fourth judging module is yes, the frequency-hopping unit selects one frequency corresponding to the minimum interference strength value from the switched frequencies, uses the selected frequency as a target frequency of frequency-hopping, and uses the minimum interference strength value as the first threshold value.

Furthermore, the interference detecting unit further includes:

a fifth judging module configured to: judge whether the interference strength values corresponding to the group of driving frequencies consecutively switched by the driving frequency switching module are all less than the predetermined second threshold value, and this group of driving frequencies is not the first scanned group; and if yes, further judge whether the latest two groups of scanned frequencies are the first two groups of scanned frequencies;

wherein, if the judging result of the fifth judging module is yes, the frequency-hopping unit abandons the interference strength values corresponding to this group of frequencies; and if the judging result is no, the frequency-hopping unit abandons the interference strength values corresponding to the latest two groups of scanned frequencies.

The present invention further provides a touch terminal, which comprises a touch detection device, and the touch detection device includes the above-mentioned noise suppression system for touch detection.

By detecting an interference strength value at each driving frequency and then using the driving frequency corresponding to the minimum interference strength value as an operating frequency, the present invention minimizes the signal interference of a touch detection system.

DETAILED DESCRIPTION OF THE PREFERRED EMBODIMENT

In order to make the objectives, technical solutions, and advantages of the present invention be clearer, the present invention will be further described hereafter with reference to the accompany drawings and embodiments. It should be understood that the embodiments described herein are only intended to illustrate but not to limit the present invention.

In the present invention, by actively detecting an interference strength value at each driving frequency, adjusting the driving frequency into a driving frequency corresponding to the minimum interference strength value, and using this driving frequency as an operating frequency, the signal interference of a touch terminal is minimized.

Figure 1:
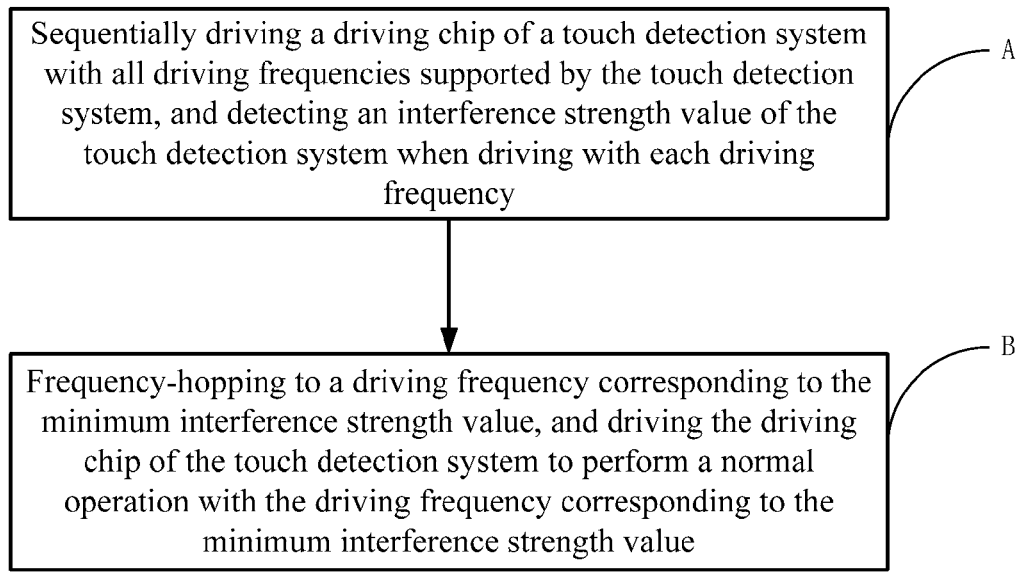
FIG. 1 is a flow chart of realizing a noise suppression method for touch detection according to one embodiment of the present invention.

FIG. 1 shows a flow chart of realizing a noise suppression method for touch detection provided by the present invention, and is detailed as follows.

Step A: sequentially driving a touch detection system with all driving frequencies supported by the touch detection system, and detecting an interference strength value of the touch detection system when driving with each driving frequency.

The present invention add interference detections into normal main cycle detections of the touch terminal, for example, this technology can be applied to GT818X, and both LCM interference and common mode interference can be avoided. A GT818X chip supports 24 kinds of driving frequencies, which are distributed in a range from 156 KHz to 962 KHz, and an interference detection is inserted in each main cycle process. GT818X only needs about 60 μs to complete a sampling on a drive, therefore, a time interval between two adjacent samplings is short; with the sum of difference values thereof and absolute values thereof being divided by 32, normal finger touch signals are basically offset after such processing (changes of signals caused by finger touches or moving actions are very slow relative to the scanning speed).

Figure 2:
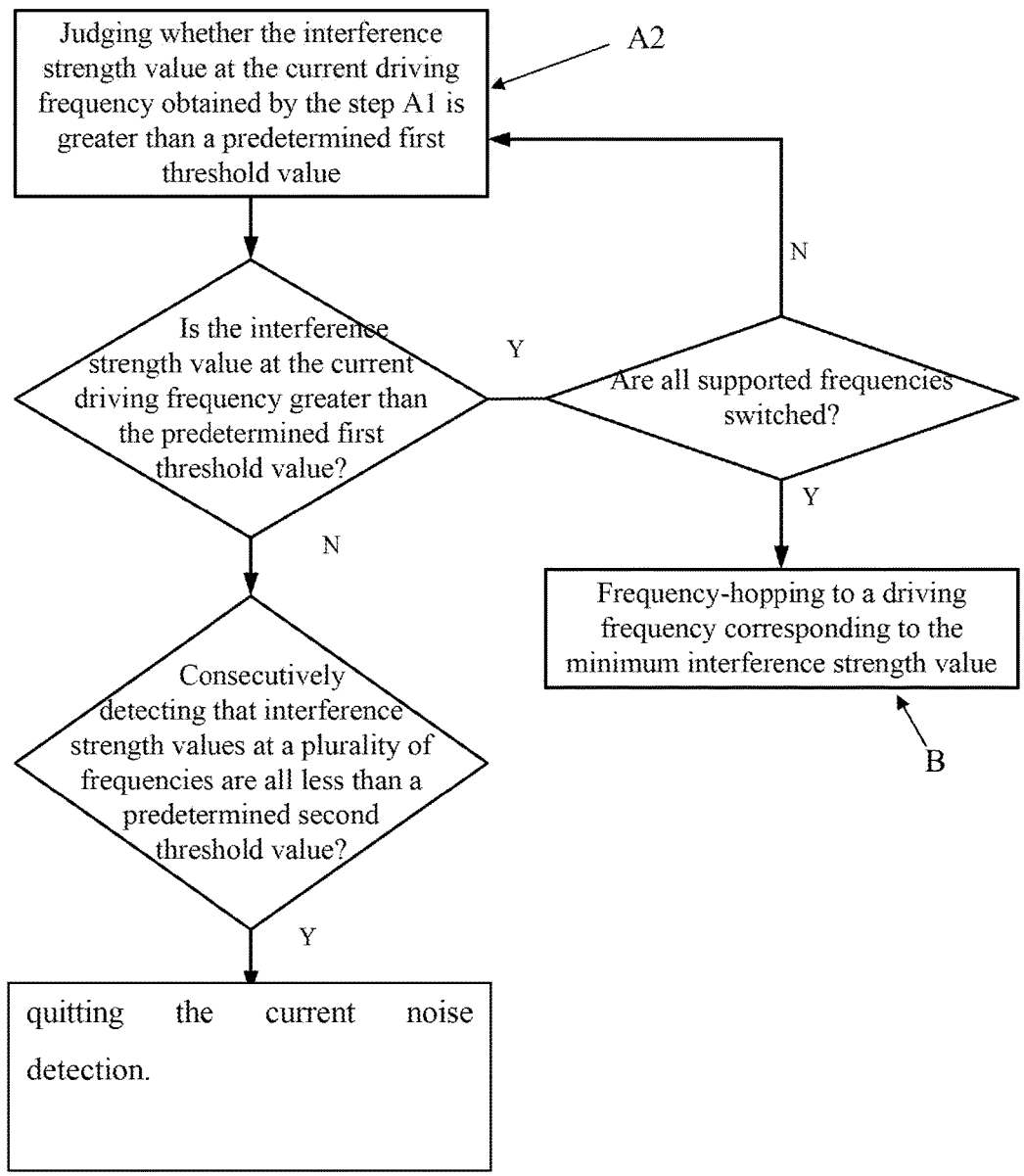
FIG. 2 is a flow chart of inserting interference detection at a current frequency point into a normal main cycle according to one embodiment of the present invention.
Figure 3:
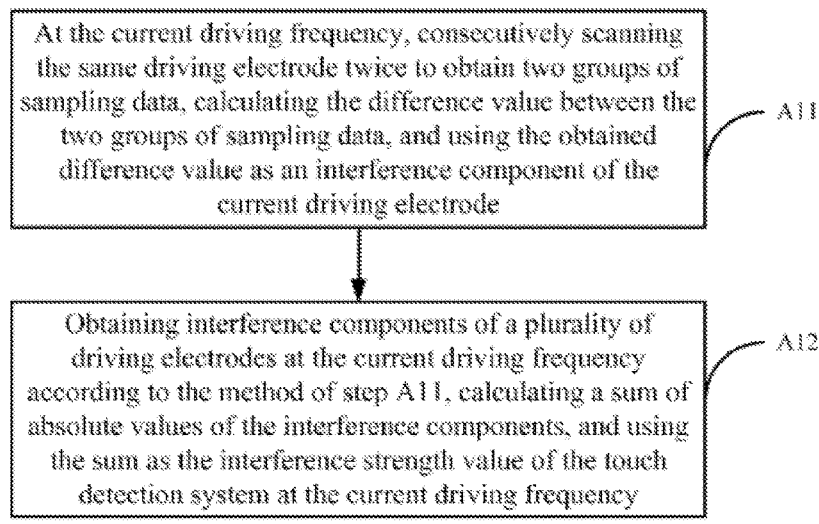
FIG. 3 is a flow chart of detecting an interference strength value at a current frequency point according to one embodiment of the present invention.

In consideration that the currently existing interference may be slight and not necessarily to reach the extent affecting the normal use, therefore, the step A can further include a judging step, in particular, referring to FIG. 2:

Step A1: driving the touch detection system with one driving frequency supported by the touch detection system, and obtaining an interference strength value at the current driving frequency;

Step A2: judging whether the interference strength value at the current driving frequency obtained by the step A1 is greater than a predetermined first threshold value;

Step A3: if yes, further switching to another driving frequency supported by the touch detection system to drive the touch detection system, repeating the steps A1 and A2, until interference strength values at all supported driving frequencies are obtained; if consecutively detecting that interference strength values at a plurality of frequencies are all less than a predetermined second threshold value, quitting the current noise detection, and backing the detected frequency point.

The predetermined second threshold value is substantially an initial value of the first threshold value. Before the normal scan, an interference strength value at the current operating frequency point is detected. If the interference strength value is less than the first threshold value, interferences at other frequency points do not need to be detected (because the current operating frequency is already good enough, and does not need frequency hopping).

A specific method for interference detection: consecutively and quickly scanning any channel many times, and treating data of every two adjacent times of scan as a group. Two frames of data in each group is differentiated and absolute value of the data is calculated, and the sum of the difference value and the absolute value of each node is treated as a group interference strength value of the group. Since a time interval between two adjacent times of scan is very short, and is usually within a range from about tens of microseconds to about 100 microseconds, therefore, the scan is equivalent to photographing with a quick photographing speed of 10000 to 20000 times per second, the effect caused by finger movements is very slight and can be ignored. However, frequencies of LCM interferences and common mode interferences usually vary in a range from 10 KHz to 1 MHz, and the photographing speed is a slow speed relative to these frequencies, so that the characteristics difference between a previous time and a next time is very obvious.

Based on the above-mentioned principle, the step A1 specifically includes the following steps:

Step A11: at the current driving frequency, consecutively scanning the same driving electrode twice to obtain two groups of sampling data, calculating the difference value between the two groups of sampling data, and using the obtained difference value as an interference component of the current driving electrode.

Step A12: obtaining interference components of a plurality of driving electrodes at the current driving frequency according to the method of step A11, calculating a sum of absolute values of the interference components, and using the sum as the interference strength value of the touch detection system at the current driving frequency.

For example, a drive Di1 is scanned to obtain sampling data 1, and the drive Di1 is scanned again to obtain sampling data 2, the data 1 is subtracted from the data 2 to obtain an interference component, and the sum of absolute values of the interference components at the detection points is calculated to obtain D1. By this method, the drives Di2 to DiN are scanned to obtain D2 to DN, and the sum of D1 to DN is calculated to obtain the interference strength value at the current driving frequency.

In particular, the step A1 can further include the following steps:

Step A13: repeating the steps A11 and A12, and obtaining a plurality of interference strength values at the current driving frequency;

Step A14: selecting the greatest value from the plurality of obtained interference strength values, and using the greatest value as the interference strength value at the current driving frequency.

At each frequency point, a plurality of groups of data is sampled (these groups of data has nothing to do with the specific drive which is selected to generate driving signals, driving effect of the driving signals is stable in a short time, after being differentiated, the effect of the driving signals vanishes, and only driving effect of interferences remains) to further obtain a plurality of interference strength values, and the greatest one of the plurality of interference strength values is selected and used as the interference strength value at the current driving frequency. Of course, the longer the time for detecting each frequency point, the higher the detecting accuracy.

Figure 4:
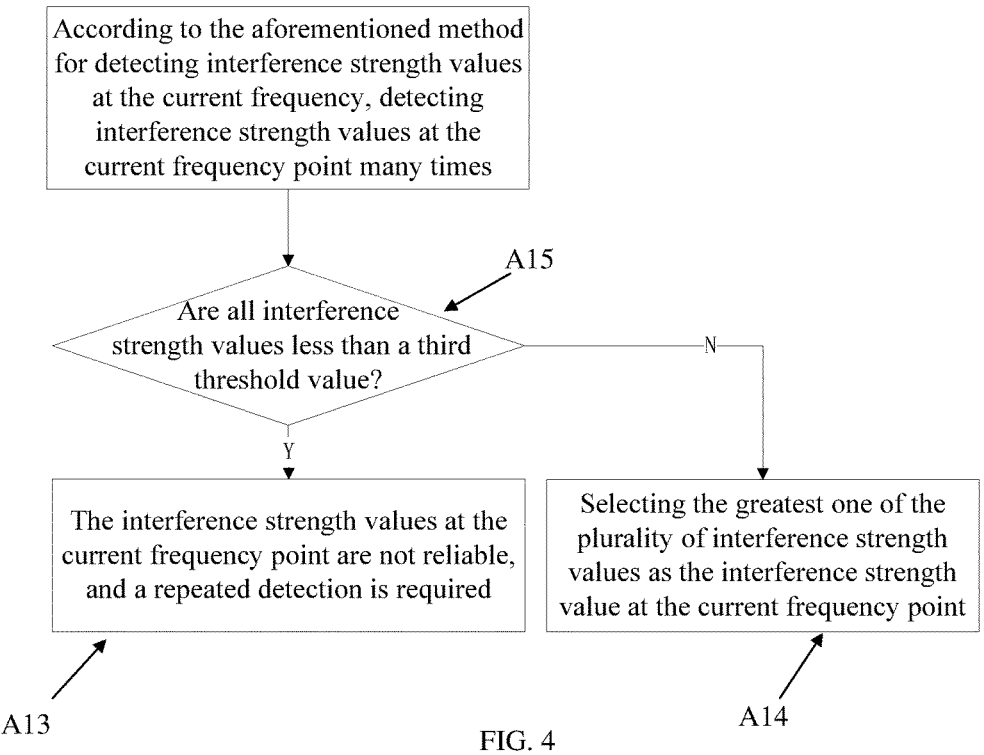
FIG. 4 is a flow chart of confirming an interference strength value at a current frequency during a process of selecting the best frequency according to one embodiment of the present invention.

In consideration that some interference only exists under certain conditions, for example, common mode interference only occurs during finger touches, and the interference strength value thereof is very small or even does not exist when there is no finger touch. Therefore, during the processes of detecting the interference strength value at each frequency point, when finding suspected cases, a reduplicate detection mechanism needs to be introduced to avoid mistaken detections. Since detecting all interference at the frequency points needs some time, and the finger may leave during this time, if a difference value at a frequency point is used as the interference strength value when the finger leaves, frequency selection errors may be caused. Therefore, when a suspected case occurs, a repeated detection is needed. Referring to FIG. 4, between the steps A13 and A14, the step A1 further includes the following step:

Step A15: judging whether the plurality of interference strength values obtained by the step A13 are all less than a predetermined third threshold value; if yes, performing the step A13 again; if no, performing the step A14.

Step B: frequency-hopping to a driving frequency corresponding to the minimum interference strength value, and driving the touch detection system to perform a normal operation with the driving frequency corresponding to the minimum interference strength value.

A frequency point with the minimum interference strength value is selected as the current working frequency, and the predetermined first threshold value is updated. After interference strength values at all frequency points are obtained, all of the interference strength values are converted according to a certain standard, so that reference points of the interference strength values are the same. The minimum value is selected from the converted interference strength values, and the frequency point corresponding thereto is selected as the current working frequency. When the interference source varies, the best working frequency is selected according to the above-mentioned process.

Figure 5:
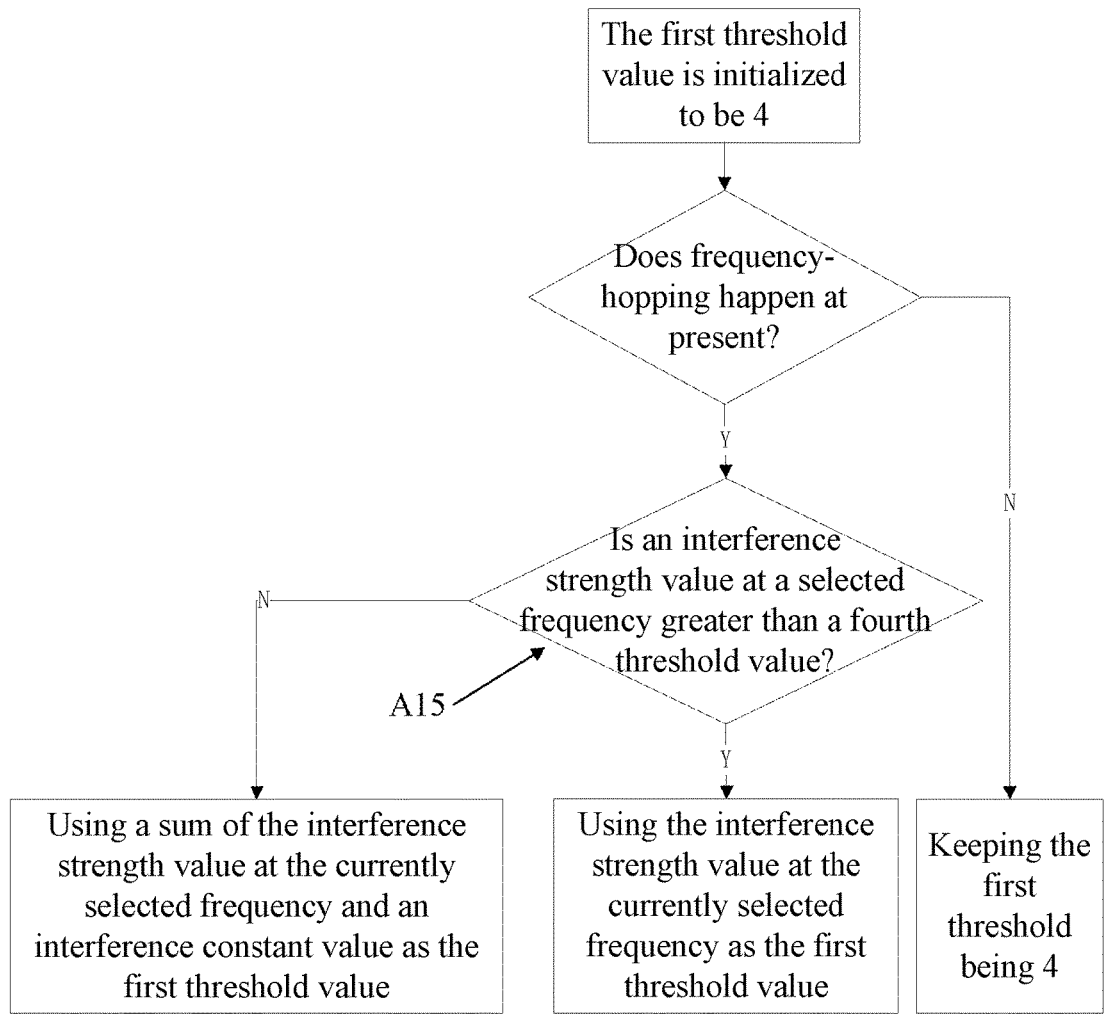
FIG. 5 is a flow chart of adjusting a predetermined first threshold value according to one embodiment of the present invention.

In order that frequency-hopping events are easier to trigger after powering up, the original value of the first threshold value when powering up is usually designed to be low (e.g., designed to be 4). In the working process, as long as slight interference is detected, a frequency-hopping event is triggered. After a frequency-hopping event occurs, if there is interference, determining that the threshold value is dynamically updated into the interference strength value at the finally selected frequency and is added with an interference constant value, and thus the detected interference fluctuations are prevented from causing repeated frequency-hopping. Therefore, after the step B, the method further includes the following steps, of which the specific flow chart is shown by the flow chart shown in FIG. 5:

Step C: judging whether the minimum interference strength value is greater than a predetermined fourth threshold value; if yes, using the minimum interference strength value as the predetermined first threshold value; if no, using a sum of the minimum interference strength value and a predetermined interference constant value (for example, in FIG. 5, the interference constant value is 50) as the predetermined first threshold value.

Common mode interferences are introduced only when there is a finger touch, and LCM interferences are introduced only when an LCM lights up. GT818X needs time to scan all of the 24 frequency points. Therefore, it should be ensured that interferences are ensured to be still superimposed on the system when the frequency points are scanned; otherwise, when detecting a very small interference, it is unable to determine whether the reason of the very small interference is that the interference is eliminated or that the current frequency can successfully avoid the interference. But in fact, it is unable to absolutely ensure that interferences are always superimposed on the system when scanning interferences at the frequency points.

Figure 6:
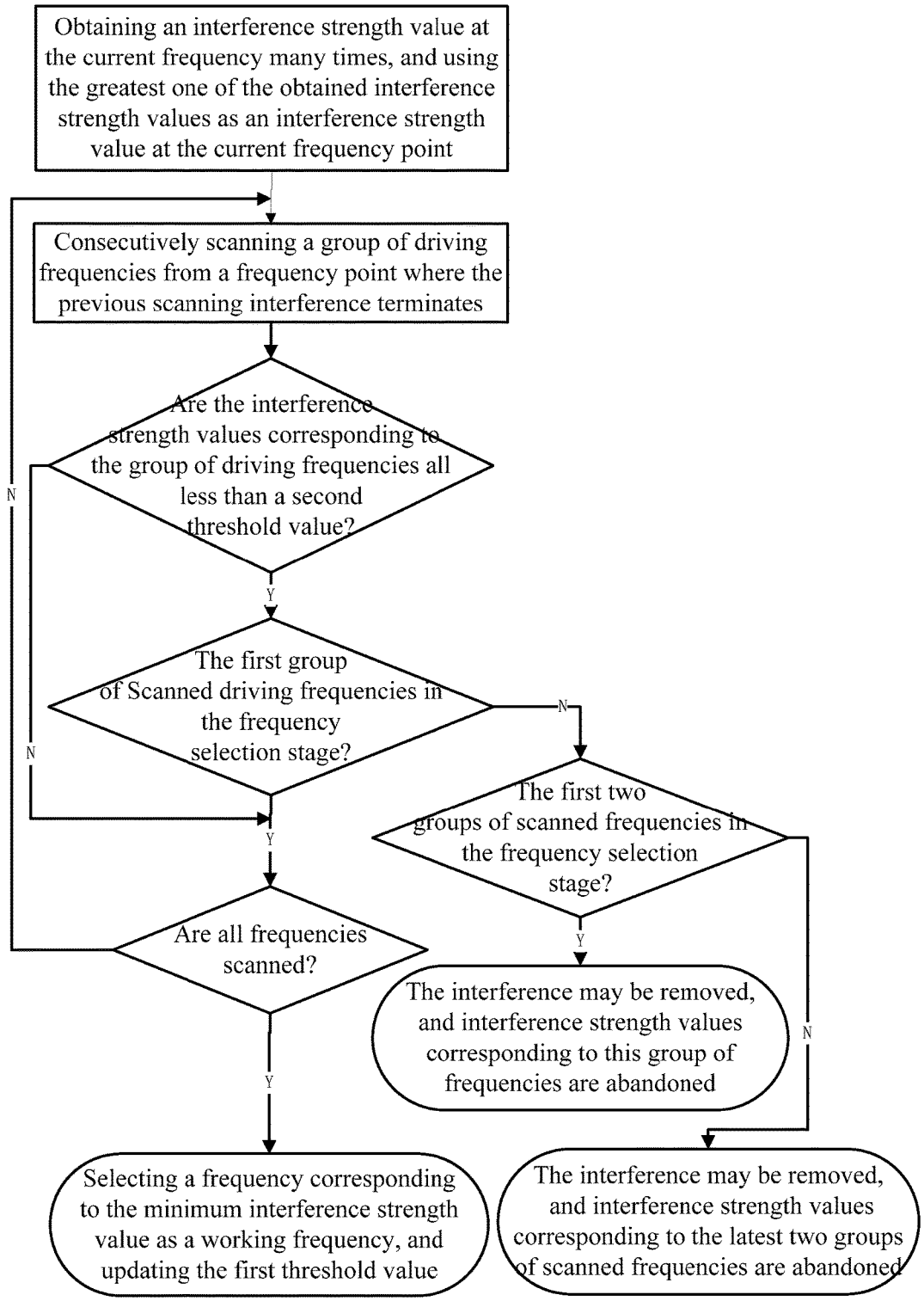
FIG. 6 is a flow chart of detecting and backing an interference strength value at each frequency point according to one embodiment of the present invention.

Therefore, when detecting that the interference value is suspicious, repeated scanning is needed. Regardless of common mode interferences or LCM interferences, that human finger touch actions change from being to not being and the LCM changes from light to dark will not happen in a short time (i.e., being less than 100 ms). Accordingly, in this embodiment, if assuming that the interference at the current working frequency is determined in a main cycle, and performing interference value scanning at the frequency points, there must be interferences existing at the first scanned four frequency points. In this embodiment, a method for scanning the interferences at the frequency points and backing the scanning when detecting a suspicious interference value is shown in FIG. 6, and can be specifically embodied in a step 3, which includes the following steps:

Step A31: if interference strength values corresponding to a group of consecutively switched driving frequencies (in FIG. 6, four frequencies is a group, that is, four frequencies can be scanned every time) are all less than the predetermined second threshold value, and this group of driving frequencies is the first scanned group, or the interference strength values corresponding to the group of consecutively switched driving frequencies are all not less than the predetermined second threshold value, but all frequencies have been switched, selecting one frequency corresponding to the minimum interference strength value from the switched frequencies, using the selected frequency as a target frequency of the frequency-hopping operation of the step B, and using the minimum interference strength value as the first threshold value.

Step A32: if the interference strength values corresponding to the group of consecutively switched driving frequencies are all less than the predetermined second threshold value, and this group of driving frequencies is not the first scanned group, further judging whether the latest two groups of scanned frequencies are the first two groups of scanned frequencies.

Step A33: if the judging result of the step A32 is yes, abandoning the interference strength values corresponding to this group of frequencies; and if the result is no, abandoning the interference strength values corresponding to the latest two groups of scanned frequencies.

The noise suppression method provided by the embodiments of the present invention can reduce both LCM interferences and common mode interferences, the method for detecting the interferences is reliable, and quick movements of fingers and other operations will not be mistakenly identified as interferences and cause frequency-hopping; more importantly, this noise suppression technology has nothing to do with specific types of product components, and has strong versatility.

One of ordinary skill in the art can understand that realization of all or some steps of the methods provided by the above-mentioned embodiments can be achieved by program instructing relevant hardware, the program can be stored in computer-readable storage medium, and the storage medium can be a ROM/RAM, a disk, a CD-ROM, etc.

Figure 7:
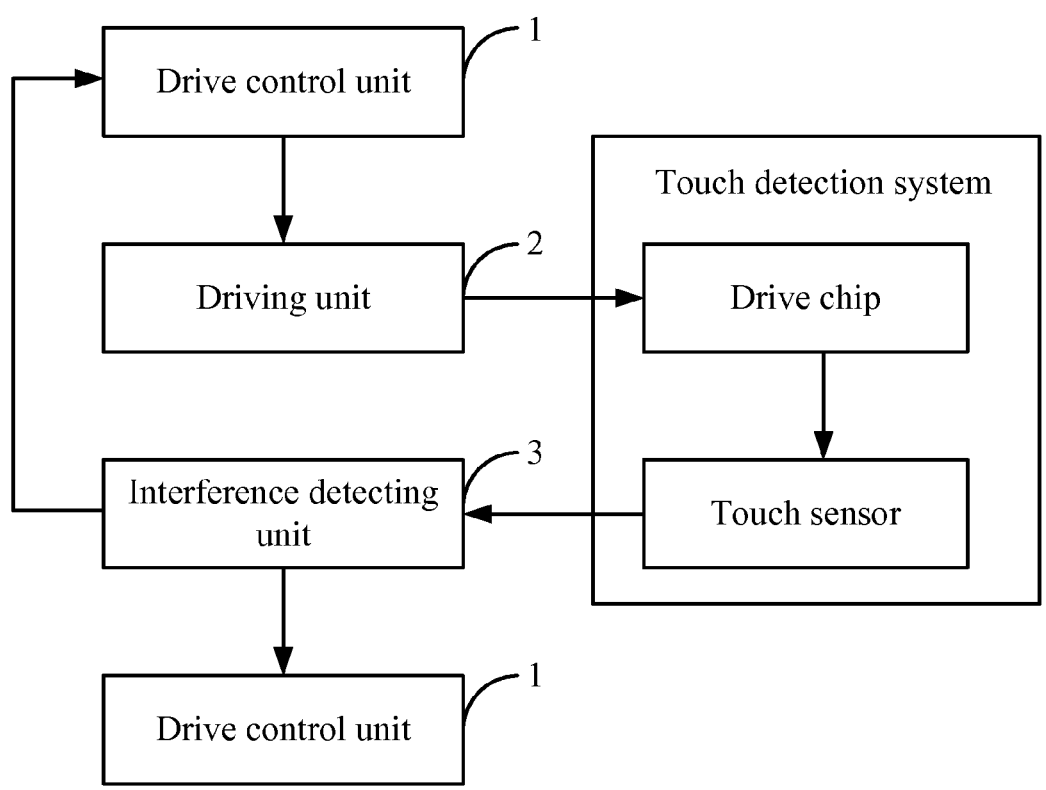
FIG. 7 is a structural schematic diagram of a noise suppression system for touch detection according to one embodiment of the present invention.

FIG. 7 is a system structural schematic diagram of a noise suppression system for touch detection according to one embodiment of the present invention. In order to facilitate the description, only the relevant parts of this embodiment are shown. This system can be built in various touch terminals.

Referring to FIG. 7, a noise suppression system for touch detection of the present invention includes a drive control unit 1, a driving unit 2, an interference detecting unit 3, and a frequency-hopping unit 4. Wherein, the driving unit 2 is configured to drive a touch detection system with a certain frequency, the touch detection system works under this frequency, and the drive control unit 1 is configured to determine a specific driving frequency of the driving unit 2. In the present invention, the drive control unit 1 controls the driving unit 2 to sequentially drive the touch detection system with all driving frequencies supported by the touch detection system. The interference detecting unit 3 is configured to identify interference signals on touch sensors, and detect an interference strength value of the touch detection system when the driving unit 2 drives with each driving frequency. Finally, the frequency-hopping unit 4 frequency-hops to a driving frequency corresponding to the minimum interference strength value according to the detection result of the interference detecting unit 3, so that the driving unit 2 drives the touch detection system to perform a normal operation with the driving frequency corresponding to the minimum interference strength value.

Figure 8:
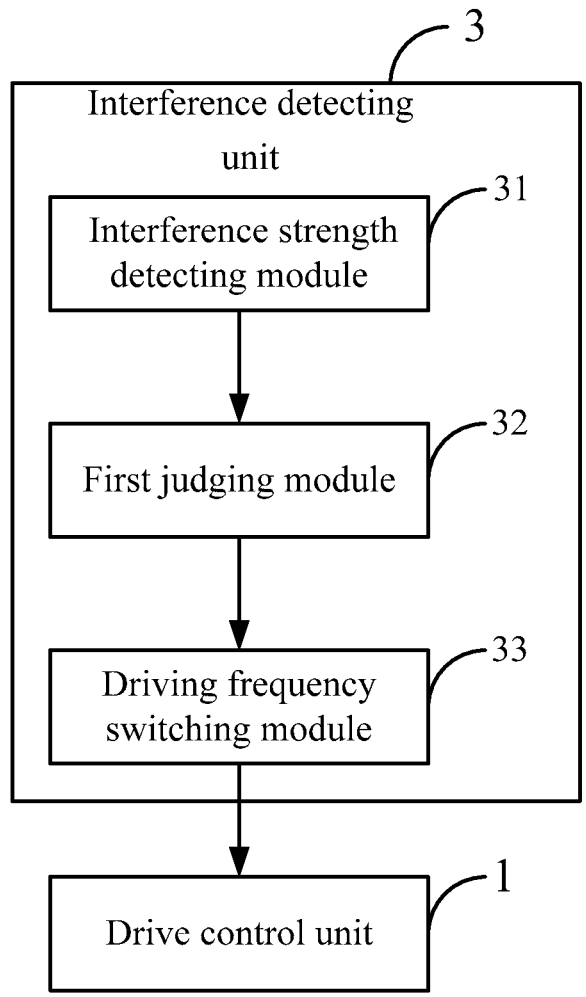
FIG. 8 is a concrete implementation structural diagram of the interference detecting unit shown in FIG. 7.

Furthermore, FIG. 8 shows a specific structure of the interference detecting unit 3, which includes an interference strength detecting module 31, a first judging module 32, and a driving frequency switching module 33. When the driving unit 2 drives the touch detection system with a driving frequency supported by the touch detection system, the interference strength detecting module 31 obtains an interference strength value at the current driving frequency. The first judging module determines the interference strength value obtained by the interference strength detecting module 31 and judges whether it is greater than a predetermined first threshold value. The driving frequency switching module 33 is configured to: when the judging result of the first judging module 32 is greater, further switching to another driving frequency supported by the touch detection system to drive the touch detection system, and triggering the drive control unit 1 to control the driving unit 2 to drive the touch detection system with the switched driving frequency.

The first judging module 32 and the driving frequency switching module 33 repeat the judging and switching processes many times until interference strength values at all supported driving frequencies are obtained; during this process, if the first judging module 32 consecutively detects that interference strength values at many frequencies are all less than a predetermined second threshold value, the current noise detection is quitted, and the detected frequency point is backed.

Figure 9:
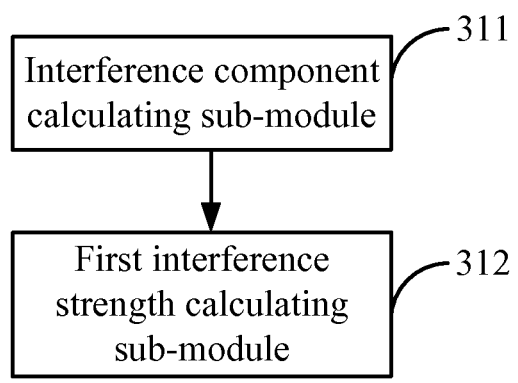
FIG. 9 is a structural schematic diagram of the interference strength detecting module 31 shown in FIG. 7.

Furthermore, a structural schematic diagram of the above-mentioned interference strength detecting module 31 is shown in FIG. 9, and an interference component calculating sub-module 311 and a first interference strength calculating sub-module 312 are included. Wherein, the interference component calculating sub-module 311 is configured to: at the current driving frequency, consecutively scan each driving electrode twice to obtain two groups of sampling data, calculate the difference value between the two groups of sampling data, and use the obtained difference value as an interference component of the corresponding driving electrode; and the first interference strength calculating sub-module 312 is configured to: calculate a sum of absolute values of the interference components obtained by the interference component calculating sub-module 311, and use the sum as the interference strength value of the touch detection system at the current driving frequency.

Figure 10:
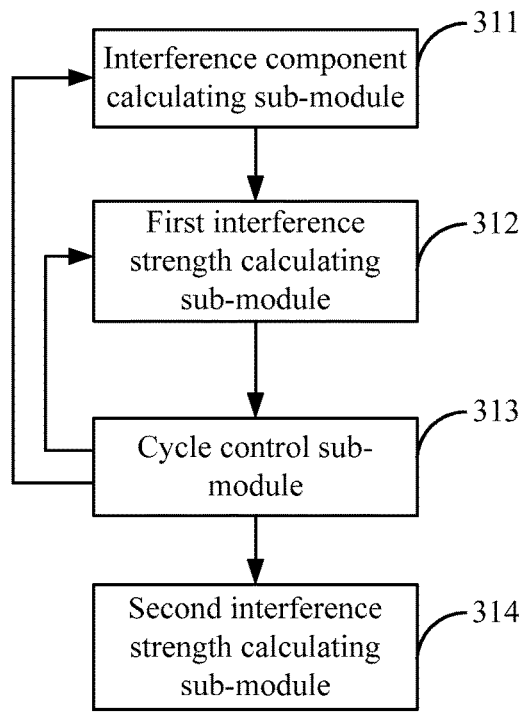
FIG. 10 is a modified structural schematic diagram of the interference strength detecting module 31 shown in FIG. 9.

On this basis, as shown in FIG. 10, the interference strength detecting module 31 can further include a cycle control sub-module 313 and a second interference strength calculating sub-module 314. The former is configured to control the interference component calculating sub-module 311 and the first interference strength calculating sub-module 312 to operate repeatedly and obtain a plurality of interference strength values at the current driving frequency; and the latter is configured to select the greatest value from the plurality of interference strength values obtained by the cycle control sub-module 313 and use the greatest value as the interference strength value at the current driving frequency.

Figure 11:
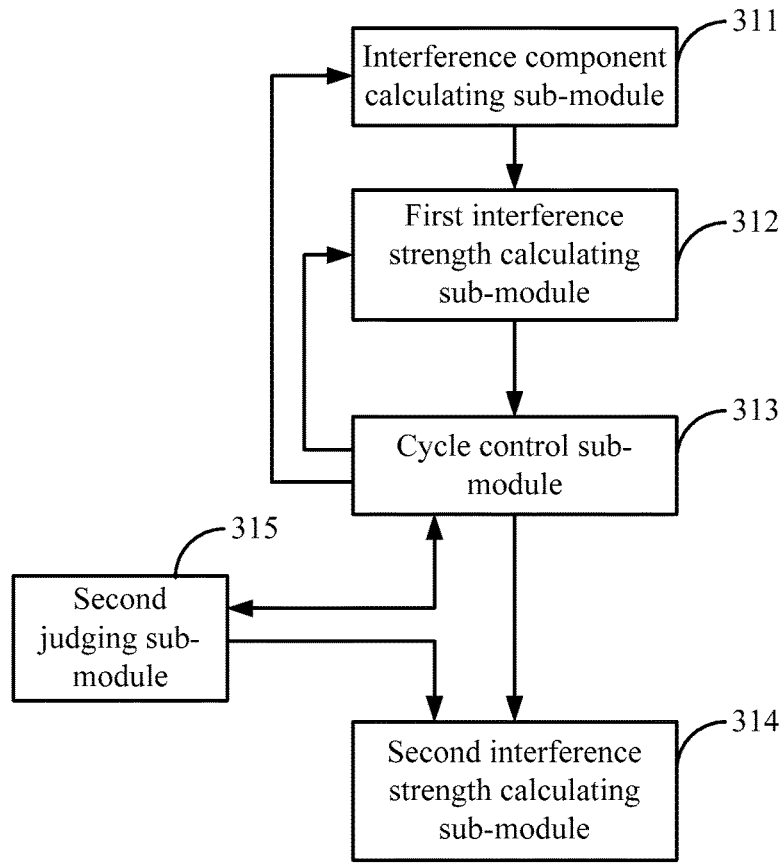
FIG. 11 is a further modified structural schematic diagram of the interference strength detecting module 31 shown in FIG. 10.

Furthermore, as shown in FIG. 11, the interference strength detecting module 31 can further include a second judging sub-module 315, which is configured to: judge whether the plurality of interference strength values obtained by the cycle control sub-module 313 are all less than a predetermined third threshold value; if yes, control the cycle control sub-module 313 to perform a cycle control again; and if no, control the second interference strength calculating sub-module 314 to select the greatest value from the plurality of interference strength values and use the greatest value as the interference strength value at the current driving frequency.

Furthermore, the noise suppression system for touch detection of the present invention further includes a third judging module, which is configured to: judge whether the minimum interference strength value is greater than a predetermined fourth threshold value; if yes, use the minimum interference strength value as the predetermined first threshold value; and if no, use a sum of the minimum interference strength value and a predetermined interference constant value as the predetermined first threshold value.

Figure 12:
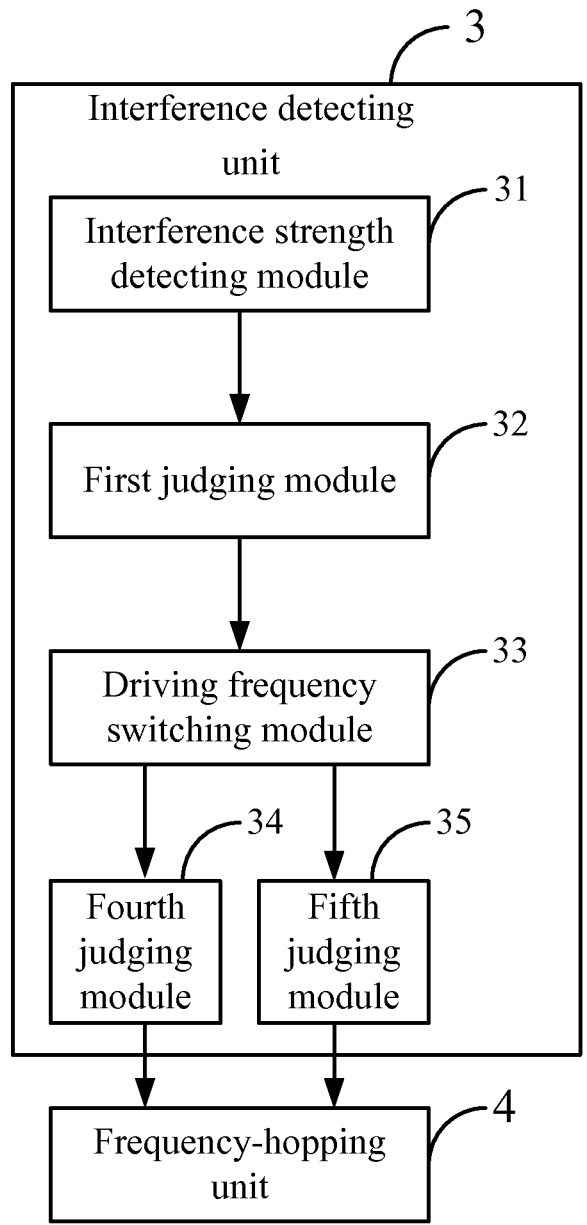
FIG. 12 is a modified structural schematic diagram of the interference detecting unit shown in FIG. 8.

Furthermore, the interference detecting unit 3 further includes a fourth judging module 34 and a fifth judging module 35, as shown in FIG. 12. The fourth judging module 34 is configured to judge whether interference strength values corresponding to a group of driving frequencies consecutively switched by the driving frequency switching module 33 are all less than the predetermined second threshold value, and this group of driving frequencies is the first scanned group, or whether the interference strength values corresponding to the group of consecutively switched driving frequencies are all not less than the predetermined second threshold value, but all frequencies have been switched. When the judging result of the fourth judging module 34 is yes, the frequency-hopping unit 4 selects one frequency corresponding to the minimum interference strength value from the switched frequencies, uses the selected frequency as a target frequency of frequency-hopping, and uses the minimum interference strength value as the first threshold value.

The fifth judging module 35 is configured to: judge whether the interference strength values corresponding to the group of driving frequencies consecutively switched by the driving frequency switching module 33 are all less than the predetermined second threshold value, and this group of driving frequencies is not the first scanned group; and if yes, further judge whether the latest two groups of scanned frequencies are the first two groups of scanned frequencies. If the judging result of the fifth judging module 35 is yes, the frequency-hopping unit 4 abandons the interference strength values corresponding to this group of frequencies; and if the judging result is no, the frequency-hopping unit 4 abandons the interference strength values corresponding to the latest two groups of scanned frequencies.

Functions and setting reasons of the above-mentioned units and modules are as mentioned by the above method parts, and are not repeated one by one here.

What described above are only preferred embodiments of the present invention, and are not intended to limit the scope of the present invention; and any modifications, equivalent replacements, and improvements made within the spirit and principle of the present invention should be included in the protection scope of the present invention.

What is claimed is:

1. A noise suppression method for touch detection, comprising the following steps:
   before a normal scan, detecting an interference strength value at the current operating frequency point; when the interference strength value is less than a first threshold value, driving a touching detection system with a driving frequency corresponding to the interference strength value at the current operating frequency point, else performing following steps:
   sequentially driving a touch detection system with a plurality of driving frequencies supported by the touch detection system, and detecting an interference strength value of the touch detection system when driving with each driving frequency; and frequency-hopping to a driving frequency corresponding to the minimum interference strength value, and driving the touch detection system to perform a normal operation with the driving frequency corresponding to the minimum interference strength value,
   wherein, the step of sequentially driving a touch detection system with a plurality of driving frequencies supported by the touch detection system, and detecting an interference strength value of the touch detection system when driving with each driving frequency includes the following steps:
   driving the touch detection system with one driving frequency supported by the touch detection system, and obtaining an interference strength value at the current driving frequency;
   judging whether the obtained interference strength value at the current driving frequency is greater than a predetermined first threshold value;
   when the obtained interference strength value at the current driving frequency is greater than a predetermined first threshold value, further switching to another driving frequency supported by the touch detection system to drive the touch detection system, detecting and judging whether the current interference strength value is greater than the predetermined first threshold value, until interference strength values at a plurality of supported driving frequencies are obtained;

when consecutively detecting that interference strength values at a plurality of frequencies are all less than a predetermined second threshold value, quitting the current noise detection.

2. The noise suppression method for touch detection according to claim 1, wherein, the step of driving the touch detection system with one driving frequency supported by the touch detection system, and obtaining an interference strength value at the current driving frequency includes the following steps:

at the current driving frequency, consecutively scanning the same driving electrode twice to obtain two groups of sampling data, calculating the difference value between the two groups of sampling data, and using the obtained difference value as an interference component of the current driving electrode; obtaining interference components of a plurality of driving electrodes at the current driving frequency according to this method, calculating a sum of absolute values of the interference components, and using the sum as the interference strength value of the touch detection system at the current driving frequency.

3. The noise suppression method for touch detection according to claim 2, wherein, the step of driving the touch detection system with one driving frequency supported by the touch detection system, and obtaining an interference strength value at the current driving frequency further includes the following steps:

calculating a plurality of interference strength values at the current driving frequency; and selecting the greatest value from the plurality of obtained interference strength values and using the greatest value as the interference strength value at the current driving frequency.

4. The noise suppression method for touch detection according to claim 3, wherein, between the step of calculating a plurality of interference strength values at the current driving frequency and the step of selecting the greatest value from the plurality of obtained interference strength values and using the greatest value as the interference strength value at the current driving frequency, the method further includes the following step:

judging whether the plurality of obtained interference strength values are all less than a predetermined third threshold value; when the plurality of obtained interference strength values are all less than a predetermined third threshold value, calculating the plurality of interference strength values at the current driving frequency again; else selecting the greatest value from the plurality of obtained interference strength values and using the greatest value as the interference strength value at the current driving frequency.

5. The noise suppression method for touch detection according to claim 1, wherein, after the step of frequency-hopping to a driving frequency corresponding to the minimum interference strength value, and driving the touch detection system to perform a normal operation with the driving frequency corresponding to the minimum interference strength value, the method further includes the following step:

judging whether the minimum interference strength value is greater than a predetermined fourth threshold value; when the minimum interference strength value is greater than a predetermined fourth threshold value, using the minimum interference strength value as the predetermined first threshold value; else using a sum of the minimum interference strength value and a predetermined interference constant value as the predetermined first threshold value.

6. The noise suppression method for touch detection according to claim 1, wherein, the step of when the obtained interference strength value at the current driving frequency is greater than a predetermined first threshold value, further switching to another driving frequency supported by the touch detection system to drive the touch detection system, detecting and judging whether the current interference strength value is greater than the predetermined first threshold value, until interference strength values at a plurality of supported driving frequencies are obtained; when consecutively detecting that interference strength values at a plurality of frequencies are all less than a predetermined second threshold value, quitting the current noise detection includes the following steps:

when interference strength values corresponding to a group of consecutively switched driving frequencies are all less than the predetermined second threshold value, and this group of driving frequencies is the first scanned group, or the interference strength values corresponding to the group of consecutively switched driving frequencies are all not less than the predetermined second threshold value, but all frequencies have been switched, selecting a driving frequency corresponding to the minimum interference strength value from the switched driving frequencies, using the selected driving frequency as a target frequency of frequency-hopping, and using the minimum interference strength value as the predetermined first threshold value.

7. The noise suppression method for touch detection according to claim 6, wherein, the method further includes the following steps:

when the interference strength values corresponding to the group of consecutively switched driving frequencies are all less than the predetermined second threshold value, and this group of driving frequencies is not the first scanned group, further judging whether the latest two groups of scanned frequencies are the first two groups of scanned frequencies;

when the judging result is yes, abandoning the interference strength values corresponding to this group of frequencies; and when the judging result is no, abandoning the interference strength values corresponding to the latest two groups of scanned frequencies.

8. A noise suppression system for touch detection, the noise suppression system is configured to detect an interference strength value at the current operating frequency point before a normal scan, when the interference strength value is less than a first threshold value, the noise suppression system is configured to drive a touching detection system with a driving frequency corresponding to the interference strength value at the current operating frequency point, the noise suppression system comprising:

a device comprising a processor and a storage device, wherein the storage device stores processor-executable programs to drive a touch detection system with a certain frequency;

a drive control device comprising a processor and a storage device, wherein the storage device stores processor-executable programs configured to control the driving unit to sequentially drive the touch detection system with a plurality of driving frequencies supported by the touch detection system;
an interference detecting device comprising a processor and a storage device, wherein the storage device stores processor-executable programs configured to detect an interference strength value of the touch detection system when the driving unit drives with each driving frequency; and
a frequency-hopping device comprising a processor and a storage device, wherein the storage device stores processor-executable programs configured to frequency-hops to a driving frequency corresponding to the minimum interference strength value according to the detection result of the interference detecting unit, and thereby make the driving unit drive the touch detection system to perform a normal operation with the driving frequency corresponding to the minimum interference strength value,
wherein, the interference detecting device includes:
an interference strength detecting module comprising a hardware processor which is configured with: when the driving device drives the touch detection system with a driving frequency supported by the touch detection system, obtain an interference strength value at the current driving frequency;
a first judging module comprising a hardware processor which is configured to determine the interference strength value obtained by the interference strength detecting module and judge whether it is greater than a predetermined first threshold value; and
a driving frequency switching module comprising a hardware processor which is configured to: when the judging result of the first judging module is greater, further switch to another driving frequency supported by the touch detection system to drive the touch detection system, and trigger the drive control device to control the driving device to drive the touch detection system with the switched driving frequency;
wherein, the first judging module and the driving frequency switching module repeat the judging and switching processes many times until interference strength values at a plurality of supported frequencies are obtained; during this process, when the first judging module consecutively detects that interference strength values at a plurality of frequencies are all less than a predetermined second threshold value, the current noise detection is quitted.

9. The noise suppression system for touch detection according to claim 8, wherein, the interference strength detecting module further includes:
an interference component calculating sub-module comprising a hardware processor which is configured to: at the current driving frequency, consecutively scan each driving electrode twice to obtain two groups of sampling data, calculate the difference value between the two groups of sampling data, and use the obtained difference value as an interference component of the corresponding driving electrode; and
a first interference strength calculating sub-module comprising a hardware processor which is configured to: calculate a sum of absolute values of the interference components obtained by the interference component calculating sub-module, and use the sum as the interference strength value of the touch detection system at the current driving frequency.

10. The noise suppression system for touch detection according to claim 9, wherein, the interference strength detecting module further includes:
a cycle control sub-module comprising a hardware processor which is configured to control the interference component calculating sub-module and the first interference strength calculating sub-module to operate repeatedly and obtain a plurality of interference strength values at the current driving frequency; and
a second interference strength calculating sub-module comprising a hardware processor which is configured to select the greatest value from the plurality of interference strength values obtained by the cycle control sub-module and use the greatest value as the interference strength value at the current driving frequency.

11. The noise suppression system for touch detection according to claim 10, wherein, the interference strength detecting module further includes:
a second judging sub-module comprising a hardware processor which is configured to: judge whether the plurality of interference strength values obtained by the cycle control sub-module are all less than a predetermined third threshold value; when the plurality of interference strength values obtained by the cycle control sub-module are all less than a predetermined third threshold value, control the cycle control sub-module to perform a cycle control again; and when the judging result is no, control the second interference strength calculating sub-module to select the greatest value from the plurality of interference strength values and use the greatest value as the interference strength value at the current driving frequency.

12. The noise suppression system for touch detection according to claim 8, wherein, the noise suppression system for touch detection further includes:
a third judging module comprising a hardware processor which is configured to: judge whether the minimum interference strength value is greater than a predetermined fourth threshold value; when the judging result is yes, use the minimum interference strength value as the predetermined first threshold value; and when the judging result is no, use a sum of the minimum interference strength value and a predetermined interference constant value as the predetermined first threshold value.

13. The noise suppression system for touch detection according to claim 8, wherein, the interference detecting device further includes:
a fourth judging module comprising a hardware processor which is configured to judge whether interference strength values corresponding to a group of driving frequencies consecutively switched by the driving frequency switching module are all less than the predetermined second threshold value, and this group of driving frequencies is the first scanned group, or whether the interference strength values corresponding to the group of consecutively switched driving frequencies are all not less than the predetermined second threshold value, but all frequencies have been switched;
wherein, when the judging result of the fourth judging module is yes, the frequency-hopping device selects one frequency corresponding to the minimum interference strength value from the switched frequencies, uses the selected frequency as a target frequency of frequency-hopping, and uses the minimum interference strength value as the first threshold value.

14. The noise suppression system for touch detection according to claim 13, wherein, the interference detecting device further includes:
- a fifth judging module comprising a hardware processor which is configured to: judge whether the interference strength values corresponding to the group of driving frequencies consecutively switched by the driving frequency switching module are all less than the predetermined second threshold value, and this group of driving frequencies is not the first scanned group; and when the interference strength values corresponding to the group of driving frequencies consecutively switched by the driving frequency switching module are all less than the predetermined second threshold value, and this group of driving frequencies is not the first scanned group, further judge whether the latest two groups of scanned frequencies are the first two groups of scanned frequencies;
- wherein, when the judging result of the fifth judging module is yes, the frequency-hopping device abandons the interference strength values corresponding to this group of frequencies; and when the judging result is no, the frequency-hopping device abandons the interference strength values corresponding to the latest two groups of scanned frequencies.

15. A touch terminal comprising a touch detection device; wherein, the touch detection device includes a noise suppression system for touch detection of claim 8.

* * * * *